United States Patent [19]
Boñiger et al.

[11] 3,938,007
[45] Feb. 10, 1976

[54] ELECTRICAL NETWORK PROTECTION DEVICE WITH AUTOMATIC SWITCH OVER BETWEEN PROTECTION CRITERIA

[75] Inventors: Jacques Boñiger, Niederrohrdorf; Venkat Narayan, Spreitenbach, both of Switzerland

[73] Assignee: BBC Brown Boveri & Company Limited, Baden, Switzerland

[22] Filed: May 23, 1974

[21] Appl. No.: 472,805

[30] Foreign Application Priority Data
May 30, 1973 Switzerland.......................... 7781/73

[52] U.S. Cl. ......... 317/27 R; 317/36 D; 317/36 TD
[51] Int. Cl.² ........................................... H02H 3/38
[58] Field of Search ........... 317/36 D, 36 TD, 36 R, 317/27 R, 33 R; 324/51, 52

[56] References Cited
UNITED STATES PATENTS

| | | |
|---|---|---|
| 3,192,442 | 6/1965 | Warrington et al............... 317/27 R |
| 3,277,345 | 10/1966 | Waldron ................................ 317/36 |
| 3,337,774 | 8/1967 | Rockefeller, Jr. .................... 317/36 |
| 3,590,324 | 6/1971 | Rockefeller, Jr............. 317/27 R X |
| 3,679,937 | 7/1972 | Ulyanitsky ........................ 317/27 R |

Primary Examiner—R. N. Envall, Jr.
Assistant Examiner—Patrick R. Salce
Attorney, Agent, or Firm—Flynn & Frishauf

[57] ABSTRACT

A distance protection device and an overcurrent protection device are coupled to a circuit breaker means of the network being protected by means of a logic system which enables the circuit breaker means to be activated by one of the two protection devices as a function of at least one signal derived from the network being protected, the at least one signal being also used in determining faults in at least one of the two protection devices. The logic system is activated by, for example, the at least one signal falling below a set minimum value. The result is the automatic change of function between distance and overcurrent protection.

9 Claims, 4 Drawing Figures

ELECTRICAL NETWORK PROTECTION DEVICE WITH AUTOMATIC SWITCH OVER BETWEEN PROTECTION CRITERIA

The invention relates to an electrical network protection apparatus, and more particularly, to such an apparatus having a distance protection device and an overcurrent protection device.

Protection devices of this kind are generally used for the supervision and selective disconnection of line sections of meshed transmission line networks in the event of a short circuit occurring in a given line section. Known distance protection devices are in general provided with a measuring device, e.g. a phase-measuring relay, which enables the site of the fault to be localized to a certain section of line. The same is applied to the supervision and selective disconnection of sections of networks. Overvoltage protection has generally another function in that distance along a line section with no branches cannot be determined by current measurement alone, and therefore selective response is possible only within network sections including branches. Nevertheless, the occurrence of overvoltage provides a general indication of faults (provided the maximum operating currents are not greater than the minimum short-circuit currents) and thus can be employed for triggering other selective protection devices.

A disadvantage of the usual distance protection devices which operate with input quantities in the form of voltages derived from the supervised network is that in the event of a fault these voltages can, under certain conditions (especially if the fault location is comparatively close to the point of measurement), decrease in magnitude so sharply that it is no longer possible to restrict the fault with certainty to a specific section of line or of the network, nor even, under certain circumstances, to determine with certainty the direction of the fault with respect to the measuring point. Selective disconnection of faults on line branches is thus also not possible. Thus, the overcurrent protection systems normally used as a fault indicator could possibly lead to indiscriminate, global disconnections, and hence to unnecessary interruptions in supply.

The object of this invention is to provide a network protection device which, in the case of fault locations far from the measuring point, exhibits the advantages of the usual distance protection system with its high selectivity and reliability of measurement, but which, in the event of faults near the measuring point, permits automatic changeover to overcurrent protection, with its high selectivity in respect of faults in branched network sections.

SUMMARY OF THE INVENTION

According to the present invention, an electrical network protection device comprises a distance protection device coupled to the electrical network and indicating a fault condition in the network responsive to signals ($U_1$ and $U_2$) derived from the network and which are a function of voltages in the network; an overcurrent protection device coupled to the electrical network and indicating a fault condition in the network responsive to a current signal ($I_f$) derived from the network and which is a function of a current flow in the network; and circuit breaker means coupled in the electrical network. The invention further includes a threshold-value logic system coupling the distance protection device and the overcurrent protection device to the circuit breaker means, and includes means for selectively enabling one of the protection devices to activate the circuit breaker means when at least one of the signals ($U_1, U_2, I_f$) derived from the electrical network, and participating in determining faults in at least one of the protection devices, falls below a set minimum value.

The object of the invention is achieved in a particularly advantageous manner, if, in accordance with a further form of the invention, the overcurrent protection device has a declining response-time/overcurrent characteristic which in the region of small fault currents is steeper, and in the region of large fault currents flatter, than a hyperbolic comparison curve. In this way, fault tripping in response to overcurrents is graded with respect to time, resulting in increased selectivity for large currents and relatively small overcurrent differences in neighboring branch sections and thus being particularly suitable for the purposes of the present invention.

DETAILED DESCRIPTION OF ILLUSTRATED EMBODIMENT

Figure 1:
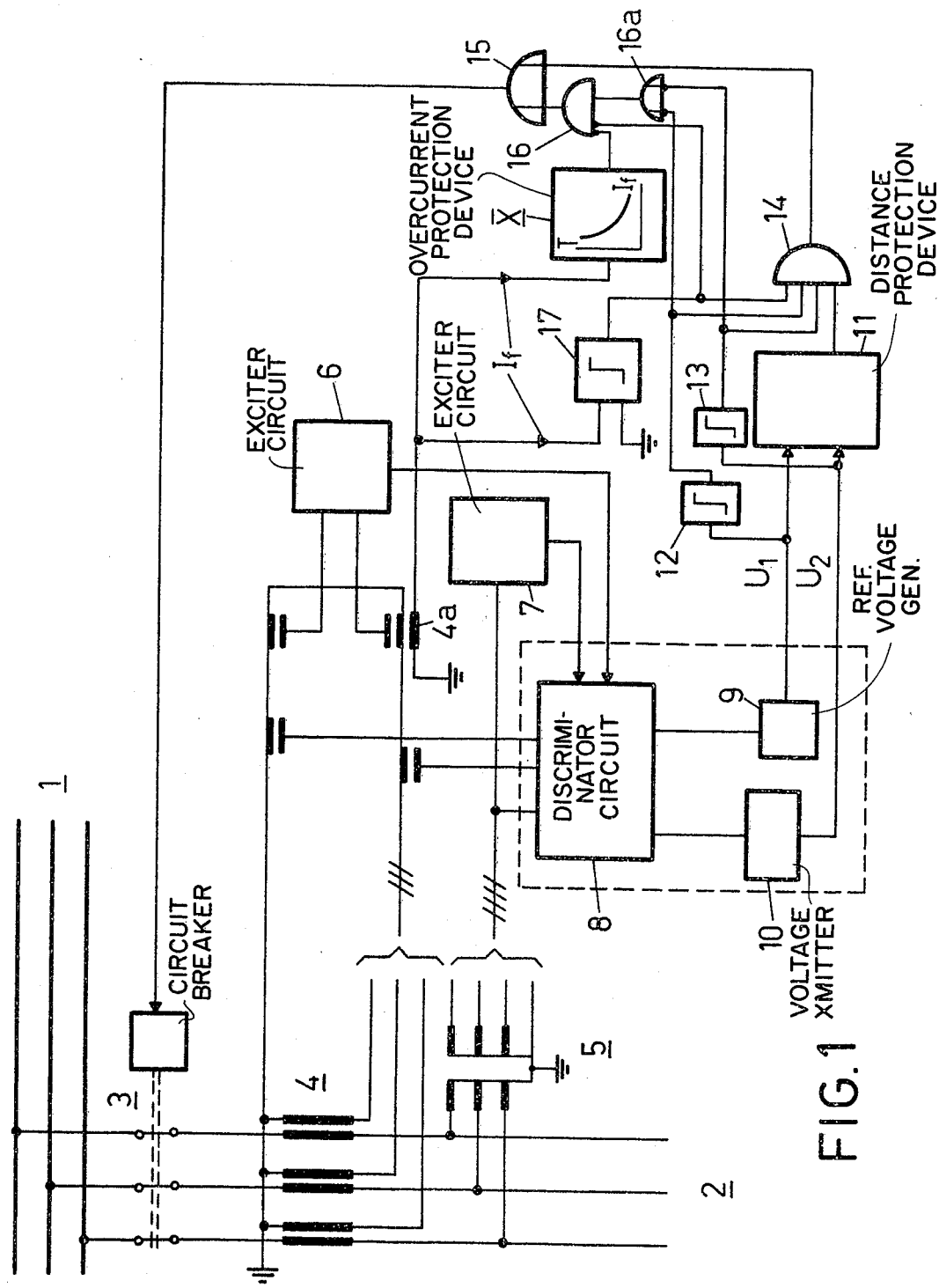
FIG. 1 is a general block diagram of a network protection device according to the present invention.

In FIG. 1 there is shown a three-phase main transmission line 1 with a branch line section 2 and the associated circuit-breaker 3 as the tripping device at the branching point. The branched line section 2 is connected over a set of current transformers 4 and voltage transformers 5 to two exciter or energizing circuits 6 and 7, as well as to a discriminator circuit 8. The exciter circuits 6,7, operating in known manner, cause the activation of the discriminator circuit 8 as a function of overcurrents, voltage drops or abnormal phase-voltage conditions. The circuit 8 in turn selects in a known manner sound and faulty transmission line phases in order to generate two voltage signals which are used for the purpose of determining the direction and/or distance of the fault in the transmission line. The discriminator circuit 8 is accordingly connected to a reference-voltage generator 9 and a fault voltage transmitter 10 which in turn generate respective signals $U_1$ and $U_2$ which activate the distance protection device 11. The discriminator circuit 8 and circuits 9 and 10 are known and do not constitute this invention. The protection device 11 includes a normal phase-measuring relay, for example, and supplies at its output, via a threshold-value switch (not shown), a yes/no signal indicating whether a fault is located inside or outside a section of line or network being supervised, and a signal denoting the direction of the fault. The output of the distance protection device 11 is accordingly connected to a control input of the circuit breaker 3 by way of an AND gate 14 and an OR gate 15.

Further provided is an overcurrent protection device X to which the fault current $I_f$ is fed by way of a current transformer 4a and the output of which supplies a tripping signal having a time delay which decreases with increasing fault current. If, following energization of overcurrent protection device X by a fault, the energization or fault current disappears again owing to disconnection elsewhere in the network, the tripping signal is not emitted by protection device X (selection by fault-current time grading). The output of the overcurrent protection device X is connected to the circuit breaker 3 by way of an AND gate 16 and OR gate 15.

The distance protection device 11 and the overcurrent protection device X are interlocked with respect to each other by means of a threshold-logic system which, in addition to the gates 14 to 16 already mentioned, also includes three threshold-value circuits (or switches) 12, 13 and 17 and also an OR gate 16a with negating inputs. The threshold circuits 12,13 and 17 emit an affirmative (i.e., 1) dual signal in the sense of the gates coupled thereto if the input quantity to the threshold circuits exceeds a preset threshold value for the respective threshold circuits. If the threshold value is not exceeded, they emit a negating (i.e., 0) dual signal. The inputs of threshold circuits 12 and 13 are thus coupled to the respective input voltages $U_1$ and $U_2$ of the distance protection device 11, while threshold circuit 17 is coupled to receive the fault current $I_f$ as its input. The manner of connecting the affirmative and negating inputs of the gates to the threshold circuits and to the output of the protection devices is clearly evident from FIG. 1.

The principle of operation of the device as a whole is as follows: Following the occurrence of a fault and energization, the protection devices 11 and X are in the operating condition (i.e., they both indicate faults). But, both are either: interlocked or blocked on the output side, depending on the output of threshold-value switch 17, by way of corresponding affirmative inputs of AND gates 14 and 16; or are released to provide an output to circuit breaker 3 via gate 15 if the fault current $I_f$ exceeds a preset value. Using the fault current in this way as a general fault indication has the effect of improving reliability.

The overcurrent protection is interlocked or blocked, with lower priority relative to the distance protection, by the negating inputs of OR gate 16a and the corresponding affirmative input of AND gate 16, i.e., it is blocked as long as the input signals $U_1$ and $U_2$ of protection device 11 exceed their minimum values as set by the threshold circuits 12 and 13, thus ensuring dependable operation of the distance protection. As an additional safety measure, the distance protection is also released by $U_1$ and $U_2$, as a function of exceeding the threshold values of circuits 12 and 13, via corresponding affirmative inputs of the AND gate 14.

The overall result is that the overcurrent protection device X remains blocked as long as the input signals $U_1$ and $U_2$ to the distance protection device 11 are of sufficient magnitude to ensure operation of the latter. If, on the other hand, the fault is so close to the measuring point that one of the voltages $U_1$ or $U_2$, i.e., the reference voltage $U_1$ or the fault measuring voltage $U_2$, or both voltages, e.g. in the case of a multiple-phase fault, falls below the preset threshold value, the overcurrent protection device X, with its time grading and corresponding selectivity, becomes effective.

Figure 2:
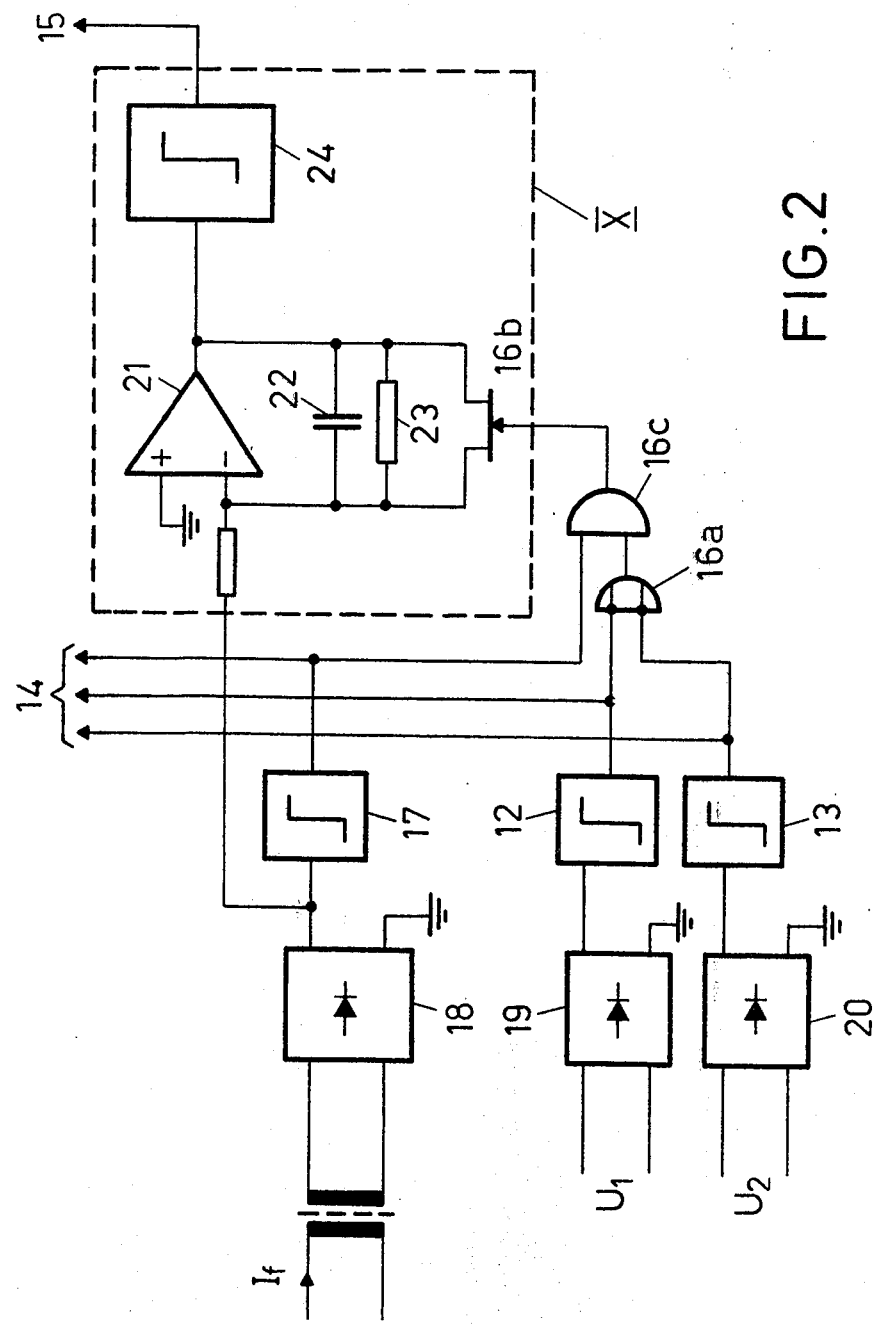
FIG. 2 is a block diagram of the overcurrent protection device, including threshold-value logic, of the network protection device shown in FIG. 1.

FIG. 2 shows an overcurrent protection device X in greater detail and the associated threshold-value logic circuits which are coupled thereto. The threshold circuits 12, 13 and 17 are fed from appropriate signal channels via rectifiers 19, 20 and 18, which are not shown in FIG. 1. In the example of FIG. 2, gate 16 is replaced by an AND gate 16c with two affirmative inputs, one of which is coupled through OR gate 16a to the threshold circuits 12 and 13 and the other of which is coupled to threshold circuit 17, and gating transistor 16b. Gate 16c, together with the switching transistor 16b (a unijunction transistor) located in protection device X, serve to selectively release or block protection device X. Device X includes an operational amplifier 21 and integrates by capacitive feedback through capacitor 22, the output voltage $u_1$ of the amplifier 21, the magnitude of the output of amplifier 21 thus increasing at a rate dependent on the magnitude of the fault current, and in the same direction. A resistor 23 coupled in parallel with capacitor 22 ensures that for a constant fault current $I_f$ this rate of rise is not linear, but follows a negative exponential saturation curve, i.e., becomes slower with increasing time. See the curve in block X in FIG. 1. As is apparent, when transistor 16b is energized the operation of amplifier 21 and integrator 22,23 is disabled.

The output of amplifier 21 is coupled to a threshold circuit 24, the output of which forms the output of protection device X. Threshold circuit 24 puts out a signal when the input thereto exceeds a given threshold value.

Figure 3A:
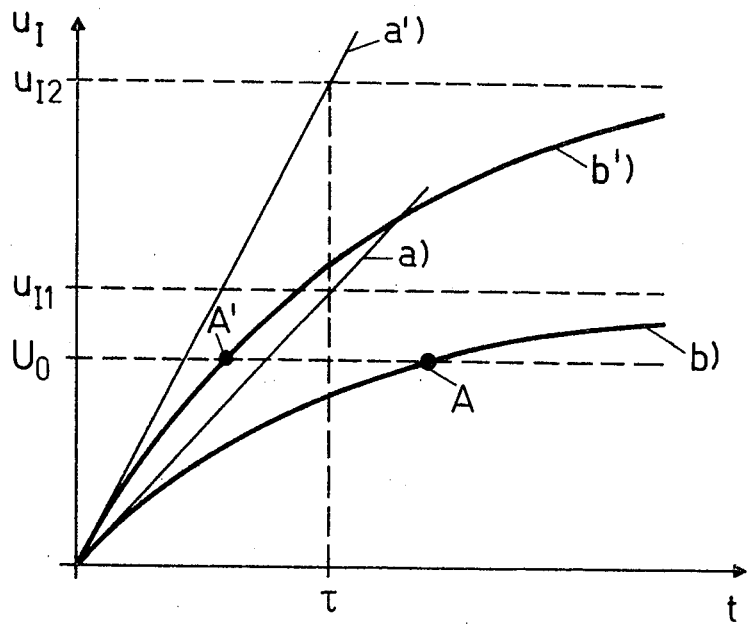
FIGS. 3a and 3b are graphs to explain the principle of operation of the overcurrent protection device shown in FIG. 2.

FIG. 3a illustrates two curves a) and b), linear and asymptotic respectively, with limit value $U_{l1}$ corresponding to a lower value $I_1$ of the fault current, and two curves a') and b') for a higher fault current value $I_2$. It can be seen that the points A and A' at which the curves of $U_l$, which are asymptotic owning to the proportional element (resistor 23), intersect with a tripping threshold value $U_0$ are displaced, compared with the corresponding linear integral curves, towards longer times, while for the same time constant $\tau$ the displacement for the lower fault current $I_1$ is very much greater than for the higher fault current $I_2$.

Thus, as fault current increases, the proportional element (resistor 23) has the effect of progressively flattening the curve representing the time T taken to reach a prescribed tripping threshold value $U_0$ as a function of fault current $I_f$, in comparison with a hyperbolic curve $T = \text{const} \, x \, 1/I_f$ corresponding to the linear integral curves.

Figure 3B:
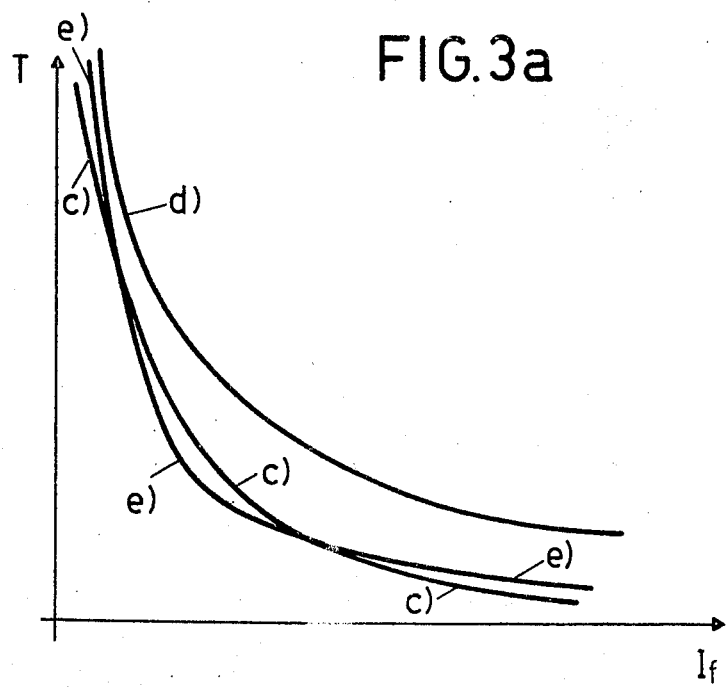

FIG. 3b illustrates the hyperbolic comparison curve c) and the curve d) which, owing to the resistor 23, is markedly steeper in the region of small fault currents, and less steep in the region of large fault currents. By simply altering the amplitude proportionality factors it is also possible to obtain a curve of shape e), which in the region of small currents is even steeper, but in the region of large currents is flatter than the hyperbolic comparison curve. This gives greater selectivity for large fault currents and relatively small current differences. Thus, the system can easily be adapted to various fault detection requirements.

The invention has been described with respect to a particular example, but variations and modifications may be made within the inventive concept.

We claim:

1. An electrical network protection device comprising:
   a distance protection device (11) coupled to said electrical network and indicating a fault condition in said network responsive to voltage signals ($U_1$ and $U_2$) derived from said network and being a function of voltages in said network;

an overcurrent protection device (X) coupled to said electrical network and indicating a fault condition in said network responsive to a current signal ($I_f$) derived from said network and which is a function of current flowing in said network;

circuit breaker means (3) coupled to said electrical network;

a threshold-value logic system coupling said distance protection device (11) and said overcurrent protection device (X) to said circuit breaker means (3) and including OR gate means (15) having an output operatively coupled to said circuit breaker means (3) and having two inputs, one of which is coupled to an output of said distance protection device (11) and the other of which is coupled through additional gating means to the output of said overcurrent protection device (X), said additional gating means comprising first AND gate means (16) having one input coupled to the output of said overcurrent protection device (X) and a further input gating means (16a) coupled with said first AND gate means and having inputs coupled to said voltage signals ($U_1$, $U_2$) through respective first threshold switches (12, 13) which deliver output signals when the corresponding voltage signals ($U_1$, $U_2$) exceed predetermined threshold values, the output signal of said first AND gate means (16) depending on at least one of said voltage signals ($U_1$, $U_2$) failing to exceed the corresponding one of said predetermined threshold values.

2. An electrical network protection device according to claim 1, wherein said threshold-value logic system further comprises a second threshold switch (17) delivering an affirmative output signal when the corresponding current in said electrical network exceeds a predetermined threshold value, said threshold-value logic system further comprising second AND gate means (14) coupled between the output of said distance protection device (11) and said OR gate means (15) and having an affirmative input coupled to the output of said second threshold switch (17) such that the output of said distance protection device (11) is operatively connected to said circuit breaker means (3) only when said current flowing in said electrical network exceeds said predetermined threshold value.

3. An electrical network protection device according to claim 2, wherein said second AND gate means (14) comprises two further affirmative inputs coupled respectively to the outputs of said first threshold switches (12, 13) such that the output of said distance protection device (11) is connected operatively to said circuit breaker means (3) only when said current flowing in the electrical network exceeds the corresponding predetermined threshold value of said second threshold switch (17), which threshold value is adjusted above any normal value of said current.

4. An electrical network protection device according to claim 1 wherein said one input of said first AND gate means (16) is an affirmative input, and wherein said output signal of said first AND gate means (16) which depends on at least one of said voltage signal is an affirmative output signal.

5. An electrical network protection device according to claim 1 wherein said further input gating means includes an OR gate (16a) with negating inputs, the output of which is coupled to an input of said first AND gate means (16).

6. An electrical network protection device according to claim 1 wherein said threshold-value logic system includes means (14, 17) responsive to said current signal ($I_f$) derived from said electrical network falling below a set minimum value to block said distance protection device (11) from activating said circuit breaker means (3) via said threshold-value logic system.

7. An electrical network protection device according to claim 1 wherein said threshold-value logic system includes means (16, 17) responsive to said current signal ($I_f$) derived from said electrical network falling below a set minimum value to block said overcurrent protection device (X) from activating said circuit breaker means (3) via said threshold-value logic system.

8. An electrical network protection device according to claim 1 wherein said overcurrent protection device (X) has a falling tripping-time vs. overcurrent characteristic which in the region of small fault currents is steeper, and in the region of large fault currents is flatter, than a hyperbolic comparison curve.

9. An electrical network protection device according to claim 1 wherein said additional gating means includes a gating element (16b) coupled to said overcurrent protection (X) device for disabling said overcurrent protection device (X).

* * * * *